(12) United States Patent
Narasimha et al.

(10) Patent No.: US 9,542,479 B2
(45) Date of Patent: Jan. 10, 2017

(54) NAVIGATION SYSTEM WITH RULE BASED POINT OF INTEREST CLASSIFICATION MECHANISM AND METHOD OF OPERATION THEREOF

(75) Inventors: Pramod Lakshmi Narasimha, Sunnyvale, CA (US); Aliasgar Mumtaz Husain, Milpitas, CA (US); Thu-Phuong Tuong Do, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 70 days.

(21) Appl. No.: 13/028,116

(22) Filed: Feb. 15, 2011

(65) Prior Publication Data

US 2012/0209861 A1    Aug. 16, 2012

(51) Int. Cl.
*G06F 7/00* (2006.01)
*G06F 17/30* (2006.01)
*G06F 17/00* (2006.01)

(52) U.S. Cl.
CPC ... *G06F 17/30705* (2013.01); *G06F 17/30707* (2013.01)

(58) Field of Classification Search
CPC .............. G06F 17/30705; G06F 17/30707

USPC .......................................................... 707/750
See application file for complete search history.

(56) References Cited

U.S. PATENT DOCUMENTS

| | | | |
|---|---|---|---|
| 6,553,365 B1 | 4/2003 | Summerlin et al. | |
| 7,409,336 B2 | 8/2008 | Pak et al. | |
| 2002/0022956 A1* | 2/2002 | Ukrainczyk et al. | 704/9 |
| 2002/0078044 A1 | 6/2002 | Song et al. | |
| 2006/0089924 A1 | 4/2006 | Raskutti et al. | |
| 2006/0242147 A1 | 10/2006 | Gehrking et al. | |
| 2007/0055933 A1* | 3/2007 | Dejean et al. | 715/533 |
| 2008/0312814 A1* | 12/2008 | Broadbent et al. | 701/200 |
| 2009/0099996 A1* | 4/2009 | Stefik | 706/54 |
| 2010/0023259 A1* | 1/2010 | Krumm et al. | 701/208 |

* cited by examiner

*Primary Examiner* — Kannan Shanmugasundaram
(74) *Attorney, Agent, or Firm* — IP Investment Law Group

(57) ABSTRACT

A method of operation of a navigation system includes: generating a point of interest term from an uncategorized point of interest; applying a statistical rule to the point of interest term to generate a category score for the point of interest term; determining a normalized category score based on the category score and on matching the point of interest term and the uncategorized point of interest; and generating a category identifier for the uncategorized point of interest based on the normalized category score being highly ranked for displaying on a device.

20 Claims, 7 Drawing Sheets

NAVIGATION SYSTEM WITH RULE BASED POINT OF INTEREST CLASSIFICATION MECHANISM AND METHOD OF OPERATION THEREOF

TECHNICAL FIELD

The present invention relates generally to a navigation system, and more particularly to a system for rule-based point of interest classification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, POIs that lack a category and are therefore not easily searchable are of paramount concern to the consumer. Consumers looking for a particular type of POI will be unable to find it without an associated category identifier.

Thus, a need still remains for a navigation system with rule based point of interest classification mechanism to accurately generate a category identifier for POIs that lack one. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a point of interest term from an uncategorized point of interest; applying a statistical rule to the point of interest term to generate a category score for the point of interest term; determining a normalized category score based on the category score and on matching the point of interest term and the uncategorized point of interest; and generating a category identifier for the uncategorized point of interest based on the normalized category score being highly ranked for displaying on a device.

The present invention provides a navigation system including: a generation module for generating a point of interest term from a brand name and a standard industry code description associated with an uncategorized point of interest; an application module, coupled to the generation module for applying a statistical rule to the point of interest term to generate a category score for the point of interest term; a category weight module, coupled to the application module for determining a normalized category score based on matching between the point of interest term and the uncategorized point of interest; and a classification module, coupled to the category weight module for generating a category identifier for the uncategorized point of interest for display on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
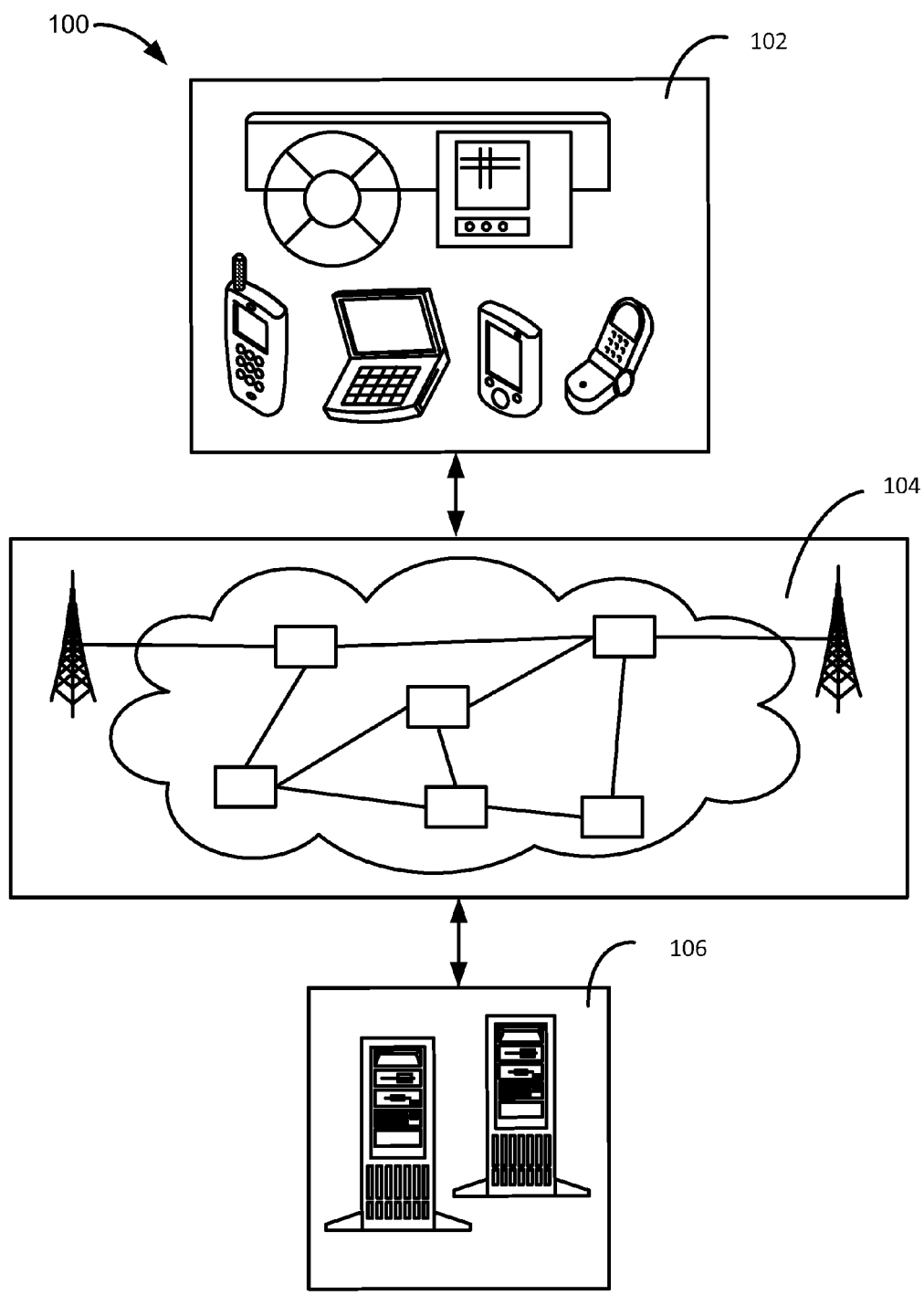
FIG. 1 is a navigation system with rule based point of interest classification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown is a navigation system 100 with rule based point of interest classification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 ™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
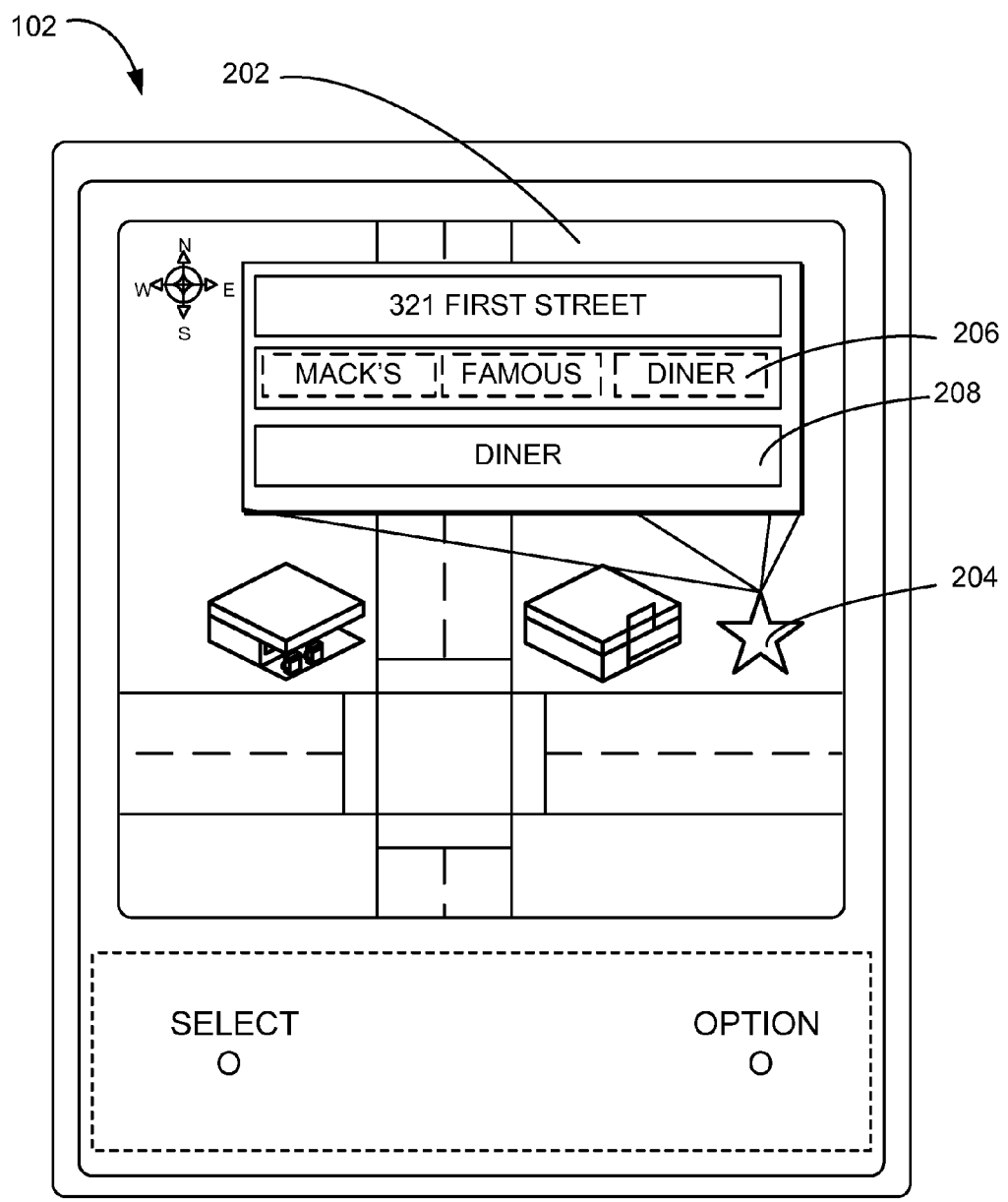
FIG. 2 is an example of a display on a display interface of the first device.

Referring now to FIG. 2, therein is shown an example of a display on a display interface 202 of the first device 102. The display interface 202 can depict a categorized point of interest 204, a point of interest term 206, and a category identifier 208.

The categorized point of interest 204 is defined as a point of interest that has an associated category or categories. For example, the categorized point of interest 204 can be Coit Tower (tourist attraction), Tokyo Tower (tourist attraction), the Sears Tower (office/tourist attraction), the Museum of Modern Art in New York City (museum/tourist attraction), Yellowstone (national park), the Louvre (museum/tourist attraction), the Mall of America (indoor mall/tourist attraction), Safeway™ (grocery store), or other locations. The categorized point of interest 204 can include an address, a name, a category, a description, or some combination thereof.

The point of interest term 206 can be derived from the categorized point of interest 204, and is defined as a partition of the text of the categorized point of interest 204. For example, the name of the categorized point of interest 204 can be broken down into single words, and all possible combinations of the words in their original order, including just a single word, can each be considered a single instance of the point of interest term 206.

The category identifier 208 is defined as the category that the categorized point of interest 204 is associated with. For example, a Starbucks™ at a particular address can be associated with the category identifier 208 of coffee shop, café, or some combination thereof. Also for example, a McDonald's™ at a particular address can be associated with the category identifier 208 of restaurant, fast food restaurant, or a combination thereof. The category identifier 208 can indicate many different kinds of categories such as 24-hour diner, Italian restaurant, shopping center, outlet mall, ice cream parlor, tourist attraction, or a combination thereof.

Figure 3:
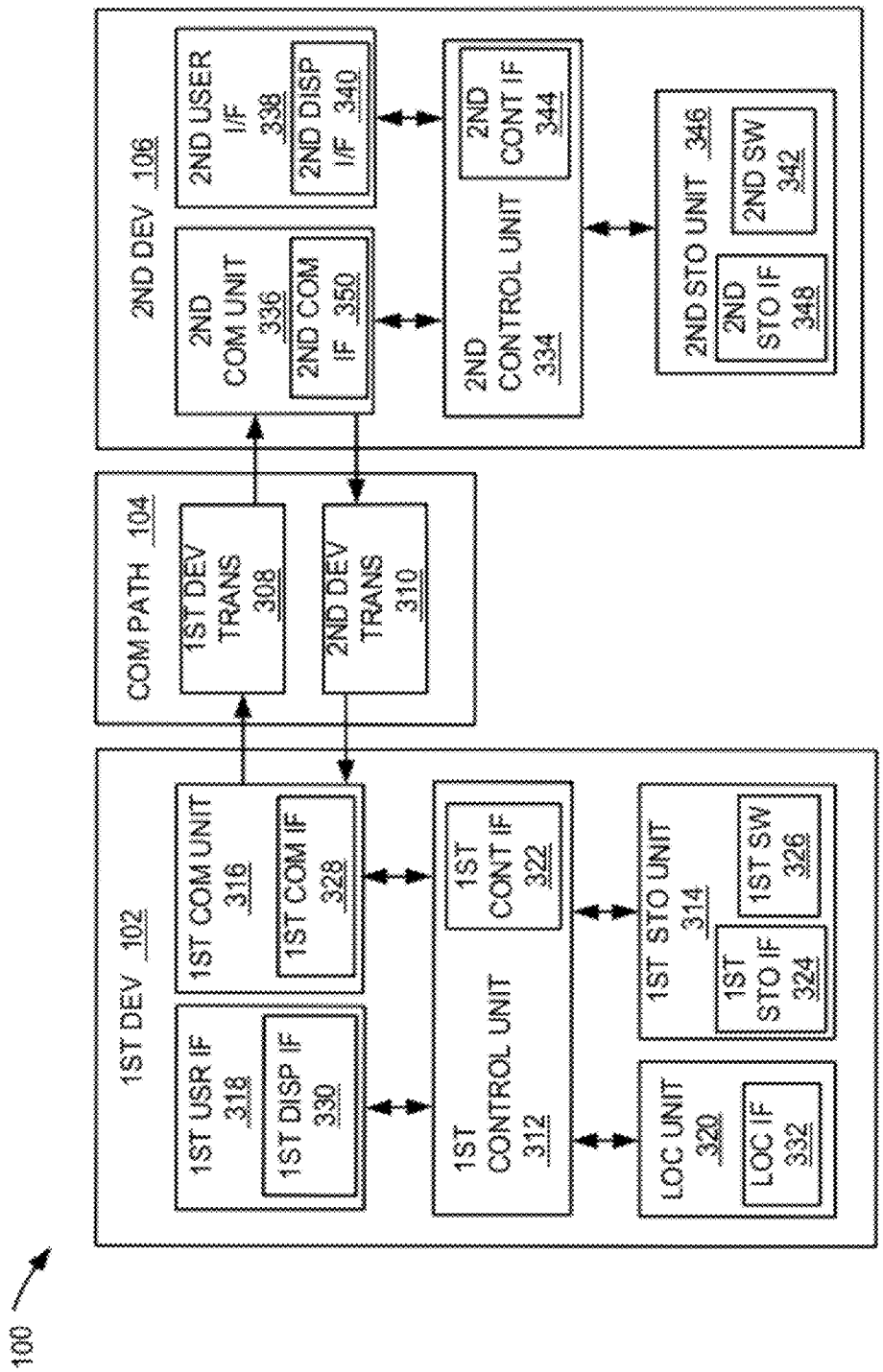
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, reviews/ratings, feedback, traffic patterns, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, reviews/ratings, feedback, traffic patterns, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
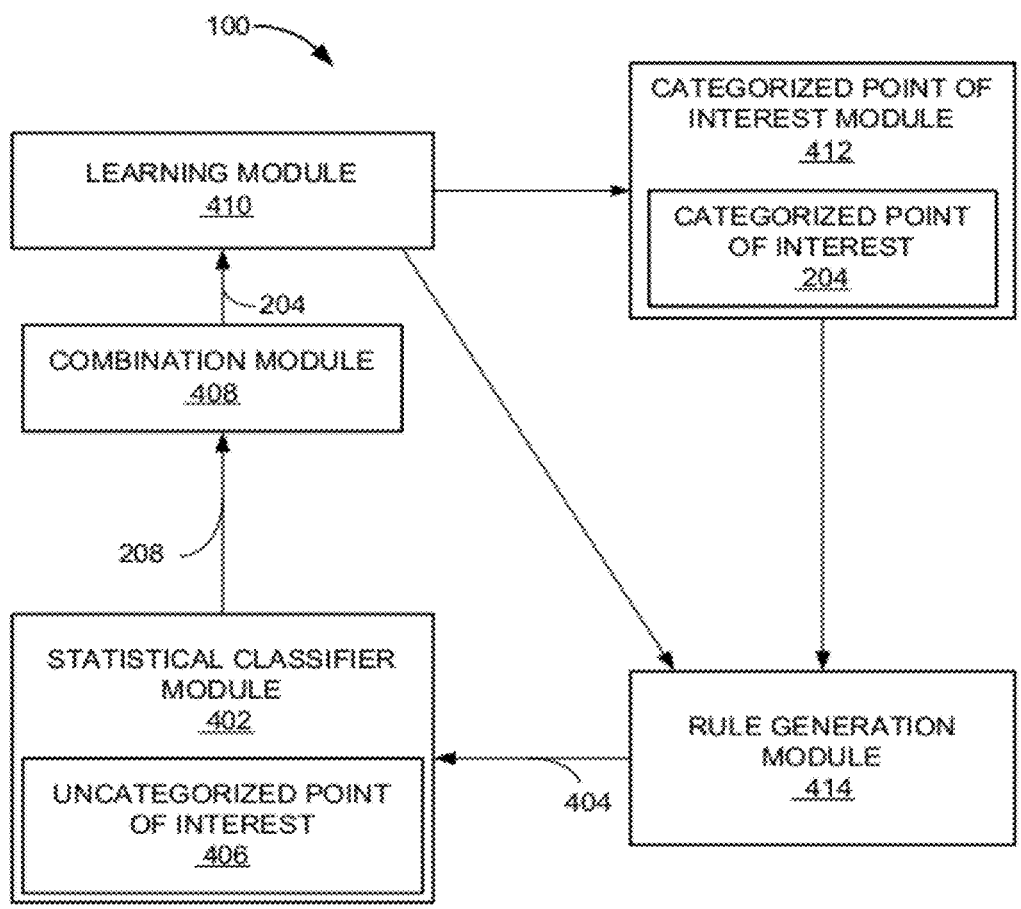
FIG. 4 is a control flow of the navigation system.

Referring now to FIG. 4, therein is shown a control flow of the navigation system 100. The navigation system 100 can include a statistical classifier module 402. The statistical classifier module 402 classifies points of interest that have not yet been categorized. The statistical classifier module 402 utilizes a statistical rule 404 to classify an uncategorized point of interest 406 and output the category identifier 208 of FIG. 2. The classification process of the statistical classifier module 402 will be detailed later in the specification.

The statistical rule 404 defines the statistical likelihood that a single instance of the point of interest term 206 of FIG. 2 will fall into a single instance of the category identifier 208. For example, the statistical rule 404 can include a function that includes the point of interest term 206, the category identifier 208, and a score that ranks the combination. Also for example, the statistical rule 404 can be created or modified manually.

The uncategorized point of interest 406 is defined as a point of interest that has yet to be categorized. The uncategorized point of interest 406 can be just like the categorized point of interest 204 of FIG. 2, except that no instance of the category identifier 208 will have been associated with the uncategorized point of interest 406. For example, the uncategorized point of interest 406 can be a new restaurant that has not been entered into any database, a new store of an existing franchise that recently opened, a recently renovated shopping mall with a new name, a store in a location not previously mapped, or a combination thereof.

The navigation system 100 can also include a combination module 408, coupled to the statistical classifier module 402. The combination module 408 receives inputs of the category identifier 208 and the uncategorized point of interest 406 and combines them to create a new instance of the categorized point of interest 204. For example, the combination module 408 can take the uncategorized point of interest 406 such as a new restaurant named "Ristorante Fiore" and associate it with the category identifier 208 of "Italian restaurant" to create the categorized point of interest 204.

The navigation system 100 can also include a learning module 410, coupled to the combination module 408. The learning module 410 takes the categorized point of interest 204 created by the combination module 408 and uses it in a number of ways. For example, the learning module 410 can update a database of instances of the categorized point of interest 204. Also for example, the learning module 410 can transmit the categorized point of interest 204 to another module to update and refine the statistical rule 404.

The navigation system 100 can also include a categorized point of interest module 412, coupled to the learning module 410. The categorized point of interest module 412 receives and stores a number of instances of the categorized point of interest 204. For example, the categorized point of interest 204 can be received from the learning module 410. Also for example, a number of instances of the categorized point of interest 204 can be stored in the categorized point of interest module 412 after being associated with the category identifier 208 automatically, manually, by another iterative process, or a combination thereof.

The navigation system 100 can also include a rule generation module 414, coupled to the learning module 410 and the categorized point of interest module 412. The rule generation module 414 generates the statistical rule 404 used in the statistical classifier module 402. The details of generating the statistical rule 404 will be discussed later.

The statistical classifier module 402 can be implemented by the navigation system 100. The statistical classifier module 402 can be implemented with the first control unit 312 of FIG. 3 and can make use of the first software 326 of FIG. 3, the first storage unit 314 of FIG. 3, the first communication unit 316 of FIG. 3, the second control unit 334 of FIG. 3, the second software 342 of FIG. 3, the first display interface 330 of FIG. 3, or some combination thereof. For example, the statistical classifier module 402 can receive the uncategorized point of interest 406 and store the uncategorized point of interest 406 in the first storage unit 314 by utilizing the first control unit 312.

The statistical classifier module 402 can use the first communication unit 316 to receive the statistical rule 404 from the second software 342 which can be implemented by the second control unit 334 and then store the statistical rule 404 in the first storage unit 314. The statistical classifier module 402 can utilize the first control unit 312 to operate the first software 326 to apply the statistical rule 404 to the uncategorized point of interest 406 and generate the category identifier 208. Also for example, after the first software 326 is used to generate the category identifier 208, the first control unit 312 can operate the first display interface 330 to display the category identifier 208.

For illustrative purposes, the statistical classifier module 402 is described as being implemented by the first control unit 312, with values being stored in the first storage unit 314, although it is understood that the statistical classifier module 402 can be implemented differently. For example, the statistical classifier module 402 can be implemented by the second control unit 334, with the uncategorized point of interest 406 and the statistical rule 404 being stored in the second storage unit 346 of FIG. 3. Also for example, the second control unit 334 can generate the category identifier 208 and use the second communication unit 336 of FIG. 3 to send the category identifier 208 to the first storage unit 314.

The combination module 408 can be implemented by the navigation system 100. The combination module 408 can be implemented by the first control unit 312, the first storage unit 314, the first software 326, or some combination thereof. For example, the category identifier 208 and the uncategorized point of interest 406 can be taken from the first storage unit 314. The first software 326 can be implemented by the first control unit 312 to combine the category identifier 208 and the uncategorized point of interest 406 to generate the categorized point of interest 204.

For illustrative purposes, the combination module 408 is described as being implemented by the first control unit 312, although it is understood that the combination module 408 can operate differently. For example, the combination module 408 can be implemented by the second control unit 334. The second control unit 334 can operate the second communication unit 336 of FIG. 3 to receive the uncategorized point of interest 406 and the category identifier 208 for storage in the second storage unit 346. The second software 342 can be implemented by the second control unit 334 to combine the uncategorized point of interest 406 and the category identifier 208 to generate the categorized point of interest 204.

The learning module 410 can be implemented by the navigation system 100. The learning module 410 can be implemented by the first control unit 312, the first communication unit 316, the second storage unit 346, or some combination thereof. For example, the first control unit 312 can operate the first software 326 to operate the first communication unit 316 and transmit the categorized point of interest 204 to the second storage unit 346.

For illustrative purposes, the learning module 410 is described as being implemented by the first control unit 312, although it is understood that the learning module 410 can be implemented differently. For example, the second control unit 334 can operate the second storage unit 346 to retrieve the categorized point of interest 204. The second control unit 334 can operate the second storage unit 346 to retrieve the categorized point of interest 204. The second control unit 334 can operate the second communication unit 336 to transmit the categorized point of interest 204.

The categorized point of interest module 412 can be implemented by the navigation system 100. The categorized point of interest module 412 can be implemented by the second control unit 334, the second storage unit 346, the second communication unit 336, the first communication unit 316, or some combination thereof. For example, the categorized point of interest 204 can be received by the second communication unit 336 from the first communication unit 316. The second control unit 334 can operate the second communication unit 336 and take the categorized point of interest 204 and store the categorized point of interest 204 in the second storage unit 346.

For illustrative purposes, the categorized point of interest module 412 is described as being implemented by the second control unit 334, although it is understood that the categorized point of interest module 412 can operate differently. For example, the categorized point of interest 204 can be stored in the first storage unit 314 and be accessed by the first control unit 312.

The rule generation module 414 can be implemented by the navigation system 100. The rule generation module 414 can be implemented by the second control unit 334, the second storage unit 346, the second software 342, or some combination thereof. For example, the second storage unit 346 can contain the categorized point of interest 204 and the category identifier 208. The second control unit 334 can operate the second software 342 to analyze the categorized point of interest 204 and the category identifier 208 to generate the statistical rule 404.

For illustrative purposes, the rule generation module 414 is described as being implemented by the second control unit 334, although it is understood that the rule generation module 414 can be implemented differently. For example, the first control unit 312 can transmit the categorized point of interest 204 through the first communication unit 316. The second control unit 334 can operate the second communication unit 336 to receive the categorized point of interest 204. The second control unit 334 can operate the second software 342 to determine the category identifier 208 associated with the categorized point of interest 204, and store the categorized point of interest 204 and the category identifier 208 in the second storage unit 346. The second software 342 can use the categorized point of interest 204 and the category identifier 208 to generate the statistical rule 404.

Figure 5:
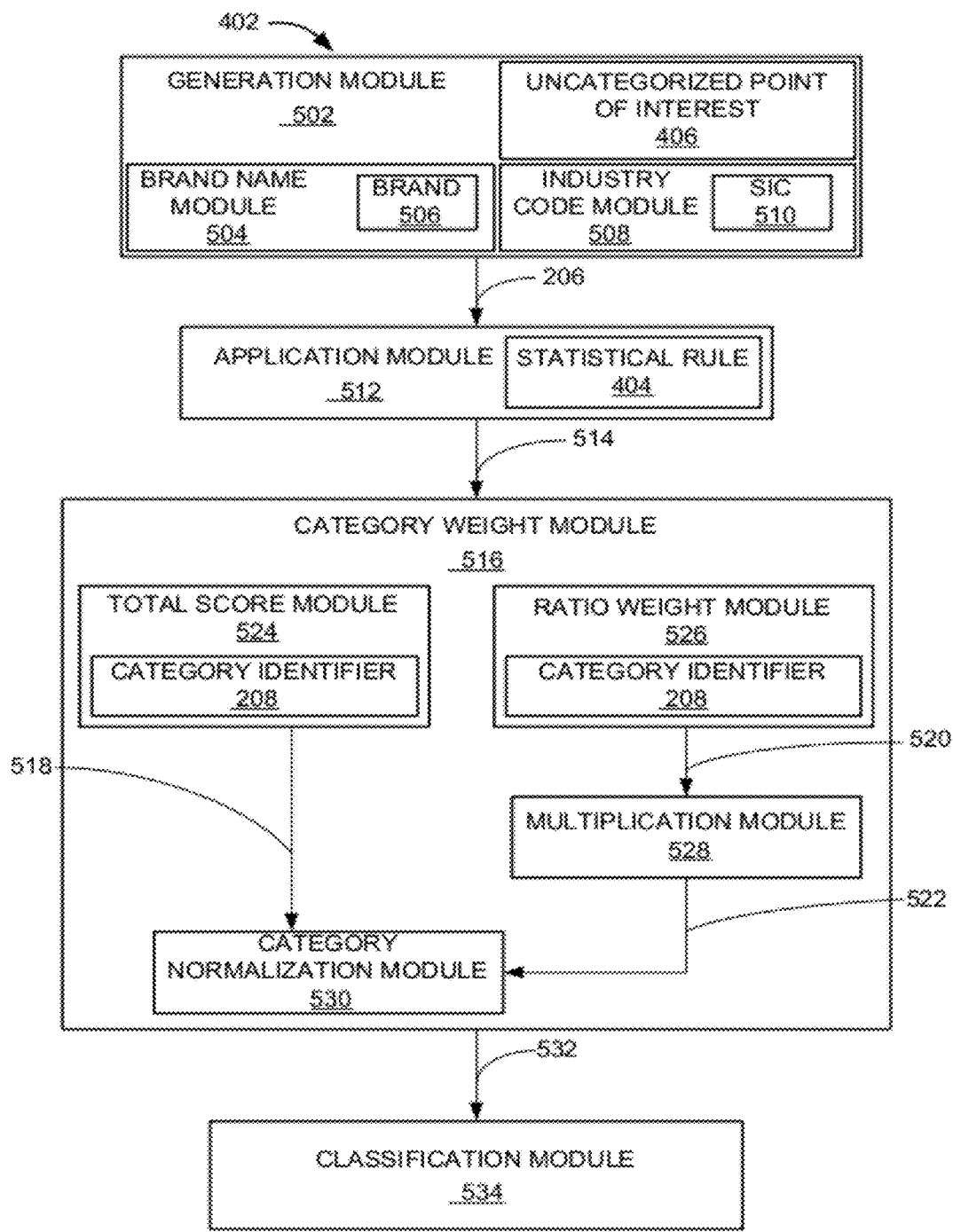
FIG. 5 is a detailed control flow of the statistical classifier module.

Referring now to FIG. 5, therein is shown a detailed control flow of the statistical classifier module 402. The statistical classifier module 402 classifies points of interest that have not yet been categorized. The statistical classifier module 402 utilizes the statistical rule 404 of FIG. 4 to classify the uncategorized point of interest 406 of FIG. 4 and output the category identifier 208.

The statistical classifier module 402 can include a generation module 502. The generation module 502 generates the point of interest term 206 from the uncategorized point of interest 406 using a number of methods. The point of interest term 206 is defined as a word or words that are part of the uncategorized point of interest 406 or the categorized point of interest 204. The process for generating the point of interest term 206 is detailed below.

The generation module 502 can include a brand name module 504. The brand name module 504 generates the point of interest term 206 from a brand name 506 of the uncategorized point of interest 406. The brand name 506 is defined as the official name of the categorized point of interest 204 or the uncategorized point of interest 406.

For example, the brand name 506 can be McDonald's™, Best Buy™, Costco Wholesale™, Six Flags Magic Mountain™, or a combination thereof. The brand name module 504 can generate the point of interest term 206 in a number of ways. The brand name module 504 can take the brand name 506 and use each word in the brand name 506 as a single instance of the point of interest term 206. The brand name module 504 can take the brand name 506 and while keeping the words in order, partition the brand name 506 into different combinations of multiple words, including the original combination of the words in the brand name 506. For example, for the brand name 506 "Six Flags Magic Mountain," the brand name module 504 can create the following list of instances of the point of interest term 206:

1. Six
2. Flags
3. Magic
4. Mountain
5. Six Flags
6. Flags Mountain
7. Magic Mountain
8. Six Flags Magic
9. Flags Magic Mountain
10. Six Flags Magic Mountain For illustrative purposes, the brand name module 504 is described as operating in English, although it is understood that the brand name module 504 can operate differently. For example, the brand name module 504 can receive the uncategorized point of interest 406 in a different language such as German, Spanish, Chinese, Japanese, or a combination thereof.

The generation module 502 can also include an industry code module 508. The industry code module 508 generates the point of interest term 206 from a standard industry code description 510 of the uncategorized point of interest 406 or the categorized point of interest 204. The standard industry code description 510 is defined as a standardized description for the categorized point of interest 204 or the uncategorized point of interest 406.

The standard industry code description 510 can be like the following example: ENVIRONMENTAL & ECOLOGICAL SERVICES|WATER & SEWAGE COMPANIES-UTILITY|PRIMARY RESOURCES/UTILITIES. In this example, each section split by the "|" symbol is a node. The point of interest term 206 can be created from the standard industry code description 510 by dividing the standard industry code description 510 into nodes along the "|" boundary, and further partitioning the nodes into instances of the point of interest term 206 in the same manner of operation as the brand name module 504. For example, the nodes would be "Environmental & Ecological Services," "Water & Sewage Companies-Utility," and "Primary Resources/Utilities." Also for example, the first node can be partitioned into the following list of instances of the point of interest term 206:

1. Environmental
2. &
3. Ecological
4. Services
5. Environmental &
6. & Ecological
7. Ecological Services
8. Environmental & Ecological
9. & Ecological Services
10. Environmental & Ecological Services For illustrative purposes, the standard industry code description 510 is described as it would appear in the United States, although it is understood that different countries can have different standardized descriptions for businesses or locations. For example, a different country may not have nodes in that country's equivalent to the standard industry code description 510.

The statistical classifier module 402 can also include an application module 512, coupled to the generation module 502. The application module 512 applies the statistical rule 404 of FIG. 4 to the point of interest term 206 to generate a category score 514 for the point of interest term 206. The category score 514 is defined as the statistical likelihood that a single instance of the point of interest term 206 belongs to an instance of the category identifier 208.

For example, the application module 512 can look for matches between the point of interest term 206 and the statistical rule 404. Also for example, the application module 512 can score the point of interest term 206 for every instance of the statistical rule 404 and generate a list of instances of the category score 514 for the point of interest term 206 where each instance of the category score 514 will correspond to an instance of the category identifier 208.

The statistical classifier module 402 can also include a category weight module 516, coupled to the application module 512. The category weight module 516 determines a normalized category score 532 based on the category score 514, a total category score 518, the category identifier 208, a category weight 520, a weighted category score 522, and the point of interest term 206. The category weight module 516 can include a total score module 524, a ratio weight module 526, a multiplication module 528, and a category normalization module 530. The normalized category score 532 is defined as the normalized statistical likelihood that an instance of the point of interest term 206 belongs to an instance of the category identifier 208.

The total score module 524 calculates the total category score 518. The ratio weight module 526 calculates the category weight 520. The multiplication module 528, coupled to the ratio weight module 526 multiplies the category score 514 with the category weight 520 to generate the weighted category score 522. The category normalization module 530, coupled to the total score module 524 and the multiplication module 528 generates the normalized category score 532 with the total category score 518 and the weighted category score 522.

The total category score 518 is defined as the sum of every instance of the category score 514 for a single instance of the category identifier 208. For example, the category score 514 for each instance of the category identifier 208 can be calculated for every instance of the point of interest term 206 for the uncategorized point of interest 406 by the total score module 524. Continuing the example, every instance of the category score 514 for the category identifier 208 can be added together by the total score module 524 to obtain the total category score 518 for the uncategorized point of interest 406.

The category weight 520 is defined as the weight for the category score 514 from a particular instance of the category identifier 208 based on how often the point of interest term 206 derived from the uncategorized point of interest 406 falls within the category identifier 208. For example, for each instance of the category identifier 208, the ratio weight module 526 can calculate a ratio of the number of instances of the point of interest term 206 in the uncategorized point of interest 406 to the number of instances of the point of interest term 206 in the uncategorized point of interest 406 that belong to the category identifier 208. Also for example, the ratio weight module 526 can normalize the category weight 520 with an inverse logarithmic function.

As a further example, the category weight 520 can be represented by Equation 1. The number of instances of the point of interest term 206 in the uncategorized point of interest 406 can be represented by $N_{rt}$. The number of instances of the point of interest term 206 in the uncategorized point of interest 406 that belong to the category identifier 208 can be represented by $N_{rt}^c$. In this case, the category weight 520 can be calculated as follows in Equation 1:

$$\text{the category weight } 520 = \left(\log \frac{N_{rt}}{N_{rt}^c}\right)^{-1} \qquad \text{Equation 1}$$

The multiplication module 528 multiplies the category score 514 and the category weight 520 to calculate the weighted category score 522. The weighted category score 522 is defined as the product of the category score 514 and the category weight 520. For example, the multiplication module 528 can multiply the category score 514 with the category weight 520.

The category normalization module 530 normalizes the weighted category score 522 to generate the normalized category score 532. For example, the category normalization module 530 can divide the weighted category score 522 with the total category score 518 resulting in the normalized category score 532.

The statistical classifier module 402 can also include a classification module 534, coupled to the category weight module 516. The classification module 534 generates the category identifier 208 for the uncategorized point of interest 406 using the normalized category score 532 and the point of interest term 206.

For example, the classification module 534 can receive the instances of the normalized category score 532 for the point of interest term 206. The classification module 534 can then select the top three ranked instances of the normalized category score 532 for the point of interest term 206 and combine the results with the top three ranked instances of the normalized category score from other instances of the point of interest term 206, which came from the uncategorized point of interest 406. Continuing the example, the instances of the normalized category score 532 from each instance of the point of interest term 206 can be added together, and the top three results can be selected as possible instances of the category identifier 208 for the uncategorized point of interest 406.

For illustrative purposes, the classification module 534 is described as selecting the top three instances of the category identifier 208, although it is understood that the classification module 534 can operate differently. For example, the classification module 534 can select only the top ranked instance of the category identifier 208, or the top five, or some combination thereof.

Also for illustrative purposes, the classification module 534 is describe as selecting the instances of the category identifier 208 in a specific way, although it is understood that other methods of selection are possible. For example, results which are more than a standard deviation above the others can be automatically selected. Also for example, results which are more than a standard deviation below the others can be automatically discarded.

The statistical classifier module 402 can be shown in pseudo code format as the following Pseudocode 1:

```
function StatisticalClassifier( )
    for each poiID ⊂ POI_IDs
        terms = gatherTerms(brand_name, SIC description, vendor
        category description)
        for each matchedRule for terms
            scoreMap.updateScore(ruleCatID, ruleScore*positional_weight)
//using (Equation 1) above
            termsList.addTermToListNoDuplicates(catID, matchedTerms)
        end for
        updateScoresBasedOnTermCount(scoreMap, termsList)
        Assign top 3 categories with highest confidences.
    end for
// end function
```

Table 1 maps functions and elements from Pseudocode 1 to the previously detailed modules and elements:

| Psuedocode 1 Elements | Specification Modules or Elements |
|---|---|
| function StatisticalClassifier( ) | the statistical classifier module 402 |
| for each poiID ⊂ POI_IDs | Optional step wherein each instance of the uncategorized point of interest 406 is assigned a unique identification code (or the POI_ID), which is also associated with each instance of the point of interest term 206 derived from the uncategorized point of interest 406 |
| terms = gatherTerms(brand name, SIC description, vendor category description) | the generation module 502, output of the point of interest term 206 |
| for each matchedRule for terms | the application module 512 |
| scoreMap.update Score(ruleCatID, ruleScore*positional_weight) | the category weight module 516 |

-continued

| Psuedocode 1 Elements | Specification Modules or Elements |
| --- | --- |
| ruleCatID | the statistical rule 404 |
| rule Score | the category score 514 |
| positional_weight | the category weight 520 |
| termsList.addTermToListNoDuplicates(catID, matchedTerms) | the classification module 534 |
|     end for | |
|     update ScoresBasedOnTermCount(scoreMap, termsList) | |
|     Assign top 3 categories with highest confidences. | |
|   end for | |

Psuedocode 1 and the pseudo codes that follow can be implemented in software, firmware, hardware, or a combination thereof. The pseudo codes describe the logic of the invention in exemplary form, and should not be read to limit implementation to any particular programming language or method of implementation.

Thus, it has been discovered that the navigation system of the present invention furnishes important and heretofore unknown and unavailable solutions, capabilities, and functional aspects for the classification of points of interest that have not yet been categorized.

Figure 6:
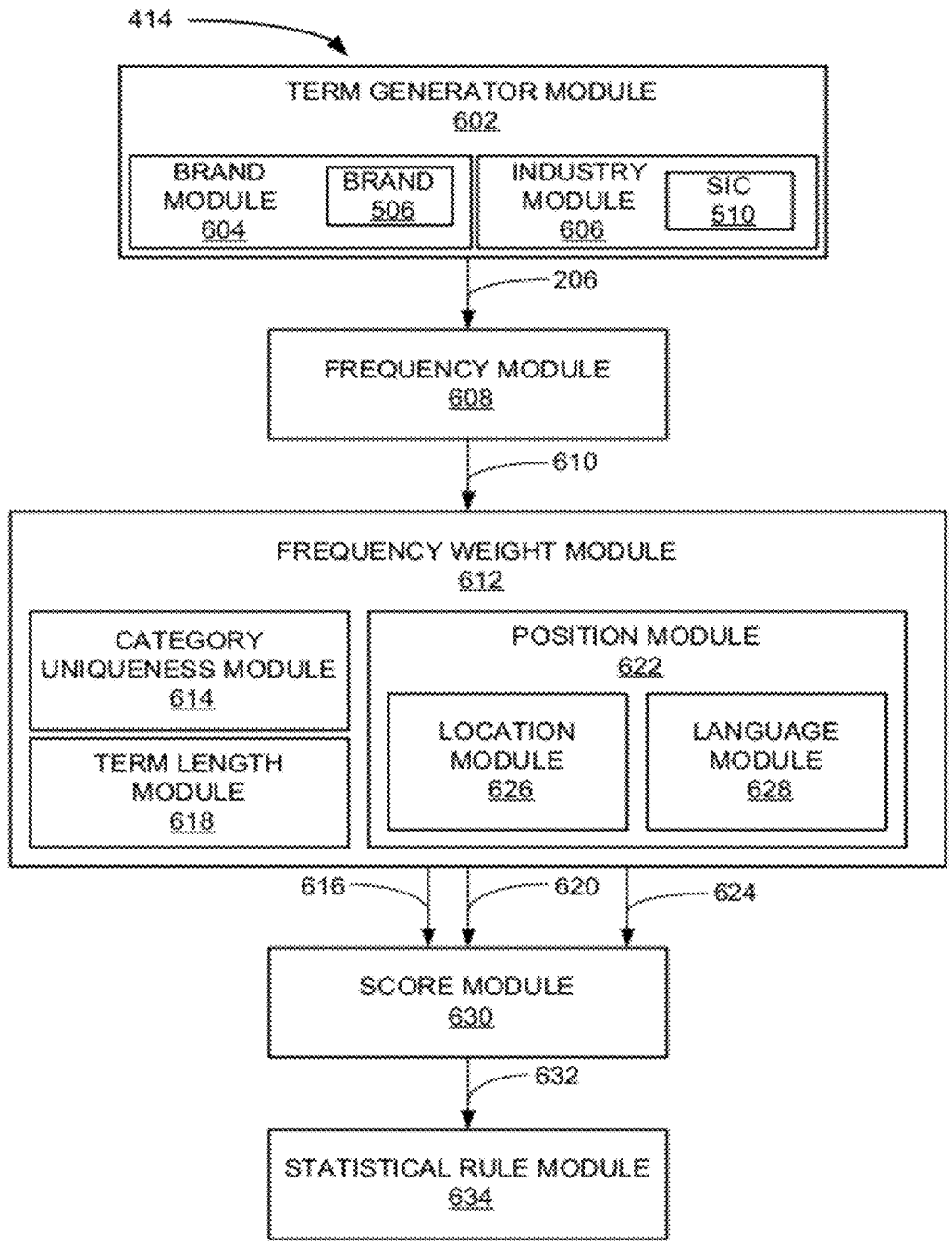
FIG. 6 is a detailed control flow of the rule generation module.

Referring now to FIG. 6, therein is shown a detailed control flow of the rule generation module 414. The rule generation module 414 can utilize the categorized point of interest 204 of FIG. 2 and the associated instance of the category identifier 208 to generate the statistical rule 404.

The rule generation module 414 can include a term generator module 602. The term generator module 602 receives the categorized point of interest 204 and uses the categorized point of interest 204 to generate the point of interest term 206. The process for generating the point of interest term 206 is detailed below.

The term generator module 602 can include a brand module 604. The brand module 604 generates the point of interest term 206 from the brand name 506 of the categorized point of interest 204.

For example, the brand name 506 can be McDonald's™, Best Buy™, Costco Wholesale™, Six Flags Magic Mountain™, or a combination thereof. The brand module 604 can generate the point of interest term 206 in a number of ways. The brand module 604 can take the brand name 506 and use each word in the brand name 506 as a single instance of the point of interest term 206. The brand module 604 can take the brand name 506 and while keeping the words in order, partition the brand name 506 into different combinations of multiple words, including the original combination of the words in the brand name 506. For example, for the brand name 506 "Six Flags Magic Mountain," the brand module 604 can create the following list of instances of the point of interest term 206:

1. Six
2. Flags
3. Magic
4. Mountain
5. Six Flags
6. Flags Mountain
7. Magic Mountain
8. Six Flags Magic
9. Flags Magic Mountain
10. Six Flags Magic Mountain For illustrative purposes, the brand module 604 is described as operating in English, although it is understood that the brand module 604 can operate differently. For example, the brand module 604 can receive the categorized point of interest 204 in a different language such as German, Spanish, Chinese, Japanese, or a combination thereof.

The term generator module 602 can also include an industry module 606. The industry module 606 generates the point of interest term 206 from the standard industry code description 510 of the categorized point of interest 204.

The standard industry code description 510 can be like the following example: ENVIRONMENTAL & ECOLOGICAL SERVICES|WATER & SEWAGE COMPANIES-UTILITY|PRIMARY RESOURCES/UTILITIES. In this example, each section split by the "|" symbol is a node. The industry module 606 can create the point of interest term 206 from the standard industry code description 510 by dividing the standard industry code description 510 into nodes along the "|" boundary, and further partitioning the nodes into instances of the point of interest term 206 in the same manner of operation as the brand module 604. For example, the nodes would be "Environmental & Ecological Services," "Water & Sewage Companies-Utility," and "Primary Resources/Utilities." Also for example, the first node can be partitioned into the following list of instances of the point of interest term 206:

1. Environmental
2. &
3. Ecological
4. Services
5. Environmental &
6. & Ecological
7. Ecological Services
8. Environmental & Ecological
9. & Ecological Services
10. Environmental & Ecological Services For illustrative purposes, the standard industry code description 510 is described as it would appear in the United States, although it is understood that different countries can have different standardized descriptions for businesses or locations. For example, a different country may not have nodes in that country's equivalent to the standard industry code description 510.

The rule generation module 414 can also include a frequency module 608, coupled to the term generator module 602. The frequency module 608 calculates a term frequency 610 for the point of interest term 206 based on the category identifier 208, the point of interest term 206, and the categorized point of interest 204. The term frequency 610 is defined as the number of times the point of interest term 206 appears in a particular grouping of instances of the categorized point of interest 204. For example, for the point of interest term 206 in regards to each instance of the category identifier 208, let the following be true:

1. n=the number of instances of the categorized point of interest 204 that contain the point of interest term 206 for each instance of the category identifier 208
2. N=the total number of instances of the categorized point of interest 204 associated with the category identifier 208

3. m=the total number of instances of the categorized point of interest 204 that contain the point of interest term 206

Continuing the example, Equation 2 (below) can represent the term frequency 610 for the point of interest term 206.

$$\text{The term frequency } 610 = \left(\frac{n}{N} - \frac{m-n}{m} + 1\right) \quad \text{Equation 2}$$

In Equation 2, for example, the term n/N can represent the frequency at which a term appears, and the term (m−n)/m can represent the inverse document frequency. The difference between n/N and (m−n)/m can represent the basis for the term frequency 610.

For illustrative purposes, the frequency module 608 is described as calculating the term frequency 610 in one particular way, although it is understood that the term frequency 610 could be calculated differently. For example, the number of instances of the point of interest term 206 could be compared to the number of instances of the categorized point of interest 204 that contained the point of interest term 206.

The rule generation module 414 can also include a frequency weight module 612, coupled to the frequency module 608. The frequency weight module 612 weighs each instance of the term frequency 610 based on the categorized point of interest 204, the category identifier 208, and the point of interest term 206. The frequency weight module 612 can include a category uniqueness module 614, a term length module 618, and a position module 622.

The category uniqueness module 614 calculates a category uniqueness factor 616 for weighting the term frequency 610. The category uniqueness factor 616 represents the uniqueness of the category identifier 208 among all the instances of the categorized point of interest 204. For example, for the category identifier 208 associated with a particular instance of the point of interest term 206 from the categorized point of interest 204, let $N_p$ represent the total number of instances of the categorized point of interest 204, and N represent the total number of instances of the categorized point of interest 204 associated with the category identifier 208. Continuing the example, the category uniqueness factor can be represented by Equation 2, which follows:

$$\text{The category uniqueness factor } 616 = \frac{1}{2 \cdot \log\frac{N_p}{N}} \quad \text{Equation 3}$$

Also for example, the logarithmic function used in Equation 3 can be used to normalize the category uniqueness factor 616 for ease of comparison between different instances of the category identifier 208.

For illustrative purposes, the category uniqueness module 614 is described as calculating the category uniqueness factor 616 in a particular way, although it is understood that the category uniqueness module 614 can operate differently. For example, the category uniqueness module 614 can calculate the category uniqueness factor 616 without using a logarithmic function.

The term length module 618 calculates a term length factor 620 based on the number of words in the point of interest term 206. The term length factor 620 can represent the total number of words in a particular instance of the point of interest term 206. For example, the more words there are in the point of interest term 206, the stronger the term length module 618 can calculate the term length factor to be, and therefore the more heavily the term length factor 620 can weigh the term frequency 610.

The position module 622 calculates a position factor 624 based on the position of the point of interest term 206 within the categorized point of interest 204. The position factor 624 can represent the importance of the point of interest term 206 at a particular position within the brand name 506. For example, the point of interest term 206 that comprises the word or words at the end of the brand name 506 can be weighted more heavily than the point of interest term 206 at the beginning of the brand name 506 since the point of interest term 206 at the beginning is more likely to be a name rather than a descriptive word. Also for example, if the categorized point of interest is "John's Burger Shack," the point of interest term 206 "Burger Shack" can be weighted more heavily than the point of interest term 206 "John's."

The position module 622 can include a location module 626 and a language module 628 for modifying the position factor 624 based on the geographic location and the local language. The location module 626 modifies the position factor 624 based on the geographic location. The language module 628 modifies the position factor 624 based on the local language and the language of the categorized point of interest 204. For example, if the point of interest term 206 is "Torito" from the categorized point of interest 204 El Torito™, and the location module 626 returns the geographic location as the United States, the language module 628 can modify the position factor 624 to weigh less heavily since the brand name 506 is in Spanish rather than English. Also for example, the location module 626 can modify the position factor 624 to be more heavily weighted for "Torito" if the category identifier 208 is "Mexican restaurant."

For illustrative purposes, the position module 622 is described as working within the geographic location of the United States, although it is understood that the position module 622 can work differently if operating within a different country such as Italy, Japan, or other country. For example, in Italy the first word in the brand name 506 can be weighted more heavily since the typical restaurant name could be something like "Ristorante Fiore," with "Ristorante" as the first word in the brand name 506 indicating the type of business (a restaurant) rather than just a name. Also for example, in countries with non-roman alphabets such as Japan, the position module 622 can still operate based on the unique naming conventions of the country by modifying the position factor 624 using the location module 626 and the language module 628.

The rule generation module 414 can also include a score module 630, coupled to the frequency weight module 612. The score module 630 generates a term score 632 based on the term frequency 610, the category uniqueness factor 616, the term length factor 620, and the position factor 624. The term score 632 represents the statistical likelihood that a single instance of the point of interest term 206 is associated with a single instance of the category identifier 208. For example, the term frequency 610 can be represented as in Equation 2, the category uniqueness factor 616 can be represented as in Equation 3, the term length factor 620 can be represented by $N_t$, the position factor 624 can be represented by the letter w, and consequently the term score 632 can be calculated by the score module 630 as below in Equation 4:

$$\text{The term score } 632 = \left(\frac{n}{N} - \frac{m-n}{m} + 1\right) \cdot \frac{1}{2 \cdot \log\frac{N_p}{N}} \cdot N_t \cdot w \quad \text{Equation 4}$$

For illustrative purposes, the score module 630 is described as operating in a specific way, although it is understood that the score module 630 can operate differently. For example, the score module 630 can use more weighting factors, fewer weighting factors, other modifiers, or some combination thereof.

The rule generation module 414 can also include a statistical rule module 634, coupled to the score module 630. The statistical rule module 634 generates the statistical rule 404 for the point of interest term 206. For example, the statistical rule module 634 can combine the point of interest term 206, the term score 632, and the category identifier 208 to generate the statistical rule 404.

For illustrative purposes, the statistical rule module 634 is described as only generating the statistical rule 404, although it is understood that the statistical rule module 634 can perform other functions. For example, the statistical rule module 634 can store the statistical rule 404 for later use by the statistical classifier module 402.

As an example, the rule generation module 414 can be shown in pseudo code format as below in Psuedocode 2:

```
function StatisticalTraining( )
    Let Ntotal be the total number of POIs and Ncid be number of
    POIs in category cid.
    for each cid ⊂ Category ID
        nCatDocs = number of documents or POIs in category cid
        term_frequency_list = <Terms in brand name and SIC
description with positional weight, Frequency in category cid>
            for each term ⊂ term_frequency_list
                nHits = number of POIs in L containing term
                falseHits = number of POIs in L containing term and
not belonging to category cid // eliminate bad rules
                    if(nHits = 0 OR (falseHits > nHits/2 AND
(nHits−falseHits)/nCatDocs < 0.3) ) continue
                    score = (nHits−falseHits)/nCatDocs − falseHits/nHits
                    score = (score+1)/2 // normalize score between 0 and 1
                    score = score/log(Ntotal/Ncid) // logarithmic weighting
                    based on POI count
                    score = score * term_weight * Nterms   // multiply
by positional weight and number of terms to boost the confidence
of rules with higher discriminating features (using Equation 4 above)
                    saveRule(term, score, cid) // rule will be saved in
                    RuleBase
        // end of term loop
    // end of cid loop
// end function
```

Table 2 maps elements from Pseudocode 2 to modules and elements previously detailed for the rule generation module 414:

| Pseudocode 2 elements | Specification modules or elements |
|---|---|
| function StatisticalTraining( ) | the rule generation module 414 |
| Let Ntotal be the total number of POIs and Ncid be number of POIs in category cid. | used later in the frequency weight module 612 |
| for each cid ⊂ Category ID nCatDocs = number of documents or POIs in category cid | |
| term_frequency_list = <Terms in brand name and SIC description with positional weight, Frequency in category cid> | listing which combines the output from the term generator module 602, the frequency module 608, and the frequency weight module 612 |
| for each term ⊂ term_frequency_list nHits = number of POIs in L containing term falseHits = number of POIs in L containing term and not belonging to category cid // eliminate bad rules if(nHits = 0 OR (falseHits > nHits/2 AND (nHits-falseHits)/nCatDocs < 0.3) ) continue score = (nHits-falseHits)/nCatDocs − falseHits/nHits | optional step to increase accuracy by eliminating outliers |
| score = (score+1)/2 // normalize score between 0 and 1 | optional normalization step |
| score = score/log(Ntotal/Ncid) // logarithmic weighting based on POI count | the category uniqueness module 614 output of the category uniqueness factor 616 into the score module 630 |
| score = score * term_weight * Nterms // multiply by positional weight and number of terms to boost the confidence of rules with higher discriminating features (using Equation 4 above) | the term length module 618 and the position module 622 output of the term length factor 620 and the position factor 624 into the score module 630 |
| saveRule(term, score, cid) // rule will be saved in RuleBase | iteration will increase accuracy - the statistical rule module 634 |

Thus, it has been discovered that the navigation system of the present invention furnishes important and heretofore unknown and unavailable solutions, capabilities, and functional aspects for generating statistical rules for categorized points of interest for later classification of uncategorized points of interest.

The physical transformation from displaying the category identifier 208 results in movement in the physical world, such as people using the first device 102, the vehicle, or a combination thereof, based on the operation of the navigation system 100. As the movement in the physical world occurs, the movement itself creates additional information that is converted back to the categorized point of interest 204 and the statistical rule 404 for the continued operation of the navigation system 100 and to continue the movement in the physical world.

The navigation system 100 describes the module functions or order as an example. The modules can be partitioned differently. For example, the categorized point of interest module 412 and the rule generation module 414 can be combined. Each of the modules can operate individually and independently of the other modules.

Furthermore, data generated in one module can be used by another module without being directly coupled to each other. For example, the statistical rule module 634 can receive the category identifier 208 from the term generator module 602.

Figure 7:
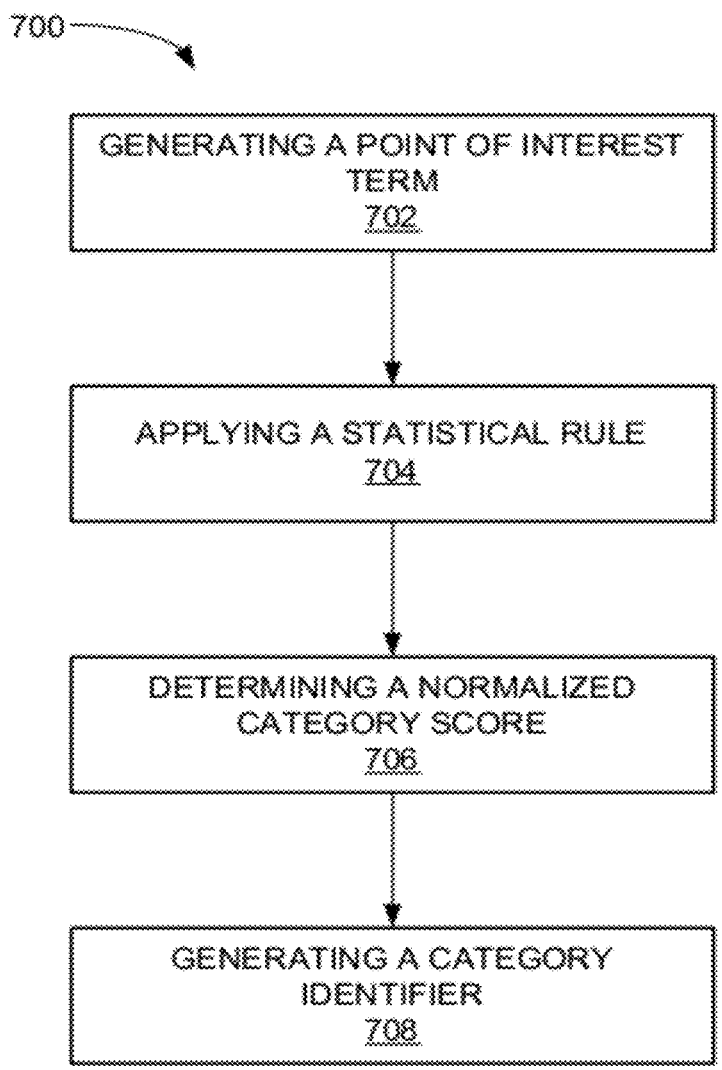
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: generating a point of interest term from an uncategorized point of interest in a block 702; applying a statistical rule to the point of interest term to generate a category score for the point of interest term in a block 704; determining a normalized category score based on the category score and on matching the point of interest term and the uncategorized point of interest in a block 706; and generating a category identifier for the uncategorized point of interest based on the normalized category score being highly ranked for displaying on a device in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    calculating a position factor based on a point of interest term generated from a brand name or a standard industry code description of a categorized point of interest;
    generating the point of interest term from an uncategorized point of interest;
    applying a statistical rule, generated based on the position factor, to the point of interest term from the uncategorized point of interest to generate a category score for the point of interest term;
    determining a normalized category score based on the category score and on matching the point of interest term from the categorized point of interest and the point of interest term from the uncategorized point of interest; and
    generating a category identifier for the uncategorized point of interest based on the normalized category score being highly ranked for displaying on a device.

2. The method as claimed in claim 1 further comprising:
    generating the point of interest term from the categorized point of interest;
    calculating a term frequency based on a number of times the point of interest term appears within the category identifier;
    weighing the term frequency based on a number of times the categorized point of interest appears within the category identifier;
    generating a term score for the point of interest term in the categorized point of interest based on the category identifier and the term frequency; and
    generating the statistical rule based on the point of interest term, the term score, and the category identifier.

3. The method as claimed in claim 1 further comprising:
    combining the category identifier with the uncategorized point of interest to create the categorized point of interest;
    transmitting the categorized point of interest; and
    receiving and storing the categorized point of interest.

4. The method as claimed in claim 1 wherein generating the point of interest term includes:
    generating the point of interest term from the brand name by separating each word in the brand name by blank spaces; and
    generating the point of interest term from the standard industry code description by separating the standard industry code description into nodes and separating each word in the node by blank spaces.

5. The method as claimed in claim 1 wherein determining a normalized category score includes:
    calculating a total category score by adding up every instance of the category score in the uncategorized point of interest for each instance of the category identifier;
    calculating a category weight based on the ratio between the number of instances of the point of interest term in the uncategorized point of interest and the number of instances of the point of interest term in the uncategorized point of interest with the category identifier;
    multiplying the category weight with the category score to obtain a weighted category score; and
    generating a normalized category score by dividing the weighted category score by the total category score.

6. A method of operation of a navigation system comprising:
    generating a point of interest term from a categorized point of interest;
    calculating a position factor based on the point of interest term generated from a brand name or a standard industry code description of the categorized point of interest;
    calculating a term frequency based on a number of times the point of interest term appears within a category identifier;
    weighing the term frequency based on a number of times the categorized point of interest appears within the category identifier and the position factor;
    generating a term score for the point of interest term in the categorized point of interest based on the category identifier and the term frequency;
    generating a statistical rule based on the point of interest term, the term score, and the category identifier;
    generating the point of interest term from an uncategorized point of interest;
    applying the statistical rule to the point of interest term to generate a category score for the point of interest term from the uncategorized point of interest;
    determining a normalized category score based on the category score and on matching the point of interest term from the categorized point of interest and the point of interest from the uncategorized point of interest;
    generating the category identifier for the uncategorized point of interest based on the normalized category score being highly ranked for displaying on a device;
    combining the category identifier with the uncategorized point of interest to create the categorized point of interest;
    transmitting the categorized point of interest; and
    receiving and storing the categorized point of interest.

7. The method as claimed in claim 6 wherein weighing the term frequency includes calculating a category uniqueness factor based on the total number of instances of the categorized point of interest and the category identifier.

8. The method as claimed in claim 6 wherein weighing the term frequency includes calculating a term length factor based on the size of the point of interest term.

9. The method as claimed in claim 6 wherein weighing the term frequency includes:
    modifying the position factor based on the geographic location of the categorized point of interest; and
    modifying the position factor based on the language of the brand name or the standard industry code description.

10. The method as claimed in claim 6 wherein generating a term score includes:
   multiplying a category uniqueness factor with the term frequency;
   multiplying a term length factor with the term frequency; and
   multiplying a position factor with the term frequency.

11. A navigation system comprising:
   a control unit including a processor for:
      calculating a position factor based on a point of interest term generated from a brand name or a standard industry code description of a categorized point of interest;
      generating a point of interest term from the brand name and the standard industry code description associated with an uncategorized point of interest;
      applying a statistical rule to the point of interest term from the uncategorized point of interest to generate a category score for the point of interest term;
      determining a normalized category score based on matching between the point of interest term from the categorized point of interest and the point of interest term from the uncategorized point of interest;
      generating a category identifier for the uncategorized point of interest; and
   a communication unit including microelectronic, coupled to the control unit, for transmitting the category identifier for display on a device.

12. The system as claimed in claim 11 wherein the control unit is for:
   generating the point of interest term from the brand name and the standard industry code description associated with the categorized point of interest;
   calculating a term frequency based on a number of times the point of interest term appears within the category identifier;
   weighing the term frequency based on a number of times the point of interest term appears within the category identifier;
   generating a term score for the point of interest term based on the category identifier and the term frequency; and
   generating the statistical rule based on the point of interest term, the term score, and the category identifier.

13. The system as claimed in claim 11 wherein the control unit is for:
   combining the category identifier with the uncategorized point of interest to create the categorized point of interest;
   transmitting the categorized point of interest; and
   receiving and storing the categorized point of interest.

14. The system as claimed in claim 11 wherein the control unit is for:
   generating the point of interest term from the brand name by separating each word in the brand name by blank spaces; and
   generating the point of interest term from the standard industry code description by separating the standard industry code description into nodes and separating each word in the node by blank spaces.

15. The system as claimed in claim 11 wherein the control unit is for:
   summing up every instance of the category score in the uncategorized point of interest for each instance of the category identifier to obtain a total category score;
   calculating a category weight based on the ratio between the number of instances of the point of interest term in the uncategorized point of interest and the number of the instances of the point of interest term in the uncategorized point of interest with the category identifier;
   multiplying the category weight with the category score to obtain a weighted category score; and
   generating the normalized category score by dividing the weighted category score by the total category score.

16. The system as claimed in claim wherein the control unit is for:
   combining the category identifier with the uncategorized point of interest to create the categorized point of interest;
   transmitting the categorized point of interest;
   receiving and storing the categorized point of interest;
   generating the point of interest term from the brand name and the standard industry code description associated with the categorized point of interest;
   calculating a term frequency based on a number of times the point of interest term appears within the category identifier;
   weighing the term frequency based on a number of times the point of interest term appears within the category identifier;
   generating a term score for the point of interest term based on the category identifier and the term frequency; and
   generating the statistical rule based on the point of interest term, the term score, and the category identifier.

17. The system as claimed in claim 11 wherein the control unit is for calculating a category uniqueness factor based on the total number of instances of the categorized point of interest and the category identifier.

18. The system as claimed in claim 11 wherein the control unit is for calculating a term length factor based on the size of the point of interest term.

19. The system as claimed in claim 11 wherein the control unit is for:
   modifying the position factor based on the geographic location of the categorized point of interest; and
   modifying the position factor based on the language of the brand name or the standard industry code description.

20. The system as claimed in claim 11 wherein the control unit is for multiplying the term frequency with a category uniqueness factor, a term length factor, and a position factor.

* * * * *